United States Patent [19]

Walker

[11] Patent Number: 4,724,589

[45] Date of Patent: Feb. 16, 1988

[54] METHOD FOR CLEANING ELECTRODES

[75] Inventor: Morris W. Walker, Invercargill, New Zealand

[73] Assignee: New Zealand Aluminum Smelters Ltd., Invercargill, New Zealand

[21] Appl. No.: 627,739

[22] Filed: Jul. 3, 1984

Related U.S. Application Data

[63] Continuation of Ser. No. 288,509, Jul. 30, 1981, abandoned.

[51] Int. Cl.[4] .................... B23P 25/00; B21L 43/00

[52] U.S. Cl. .................................... 29/81 R; 15/94

[58] Field of Search ................. 29/81 R, 81 L; 15/94; 204/141.5; 366/111, 112

[56] References Cited

U.S. PATENT DOCUMENTS 3,094,437 6/1963 Scheer .................................... 15/94

4,152,255 5/1979 Musschoot .......................... 366/128

*Primary Examiner*—Timothy V. Eley

*Attorney, Agent, or Firm*—Blakely, Sokoloff, Taylor & Zafman

[57] ABSTRACT

A method of cleaning a spent anode assembly after removal from an aluminum reduction cell, the assembly including a support rod and yoke and the remaining portions of at least one rigid carbon electrode held on the support rod and yoke and upon which is deposited solidified electrolytic material including fused cryolite, alumina and other materials used in the aluminum reduction process, the method comprising the steps of: (a) coupling a vibratable assembly coupled rigidly to the support rod and yoke; and (b) applying acceleration forces substantially though the centre of gravity of the vibratable assembly and supported spent anode assembly so that each carbon electrode has applied thereto an acceleration pattern to remove the solidified electrolytic material therefrom by generating tensile and shear forces greater than the adhesive force between the electrode and the electrolytic material.

8 Claims, 4 Drawing Figures

METHOD FOR CLEANING ELECTRODES

This is a continuation of application Ser. No. 288,509 filed July 30, 1981, now abandoned.

This invention relates to a method and apparatus for cleaning anodes.

In the smelting and refining of certain kinds of metals, it is common practice to employ electrolytic cells or furnaces consisting of a tank which is filled with an electrolyte appropriate to the type of metal and the base and/or walling of which acts as, for example, the cathode, one or more anodes being mounted above the tank so as to be wholly or partially immersed in the electrolyte. In the case of electrolytic production of aluminium, the furnace has a number of carbon block anodes which periodically become exhausted due to burning away and must be replaced. The replacement operation involves cleaning the exhausted blocks to remove residue from the furnace bath—the residue being alumina and cryolite electrolyte—so that both the carbon and residue can be separately recycled. The cryolite is relatively expensive, so that any wastage is undesirable, while for recycling the carbon an effective cleaning of the blocks is important as in subsequent baking of the crushed and remoulded carbon any impurities present in the carbon may escape as a corrosive gas and etch the brick lining of the baking kiln.

Hitherto, cleaning of the carbon block anodes has usually been carried out manually by scraping and brushing, the blocks together with their support rods and yokes having been removed as assemblies from the furnace for this purpose and to enable replacement. Each furnace may have, for example, 16 such anodes and a smelting plant includes a number of furnaces. Manual cleaning of each anode may occupy approximately 10 minutes, and the cleaning rate is typically one anode over each 24 hours per furnace. It will thus be appreciated that manual cleaning of anodes is a time-consuming and labour intensive operation, and yet cleaning is essential for recycling of used materials and thus efficient operation of the plant.

The present invention therefore has as its principal object the provision of a method and apparatus enabling mechanical cleaning of electrodes in a relatively quick and simple manner.

Other objects and advantages of the invention will be apparent from the following description.

In accordance with a first aspect of the invention there is provided a method of cleaning an electrode, which has been removed from an electrolytic bath, to remove bath residue from the electrode, the method comprising the step of vibrating the electrode to shake loose the bath residue.

Preferably, the electrode is cleaned as part of an assembly, for example electrode, support rod and yoke, the assembly being mounted on a support and the support being vibrated so as to impart vibration to the assembly and thus to the electrode. During this operation, the assembly is preferably mounted so that the electrode is suspended above a collecting surface for the residue that is shaken loose.

For preference, the vibrating step is carried out when the bath residue on the electrode has cooled to form an encrustation, for which purpose the electrode is caused or allowed to cool after removal from the electrolytic bath. In the case of, for example, the cleaning of an anode from an electrolytic cell for aluminium production, the nature of the bath residue on the anode is such that in the cooling stage it changes from a dust coat to a relatively brittle encrustation, the encrustation then being shaken off in the vibrating step as pieces. The vibrating step can, however, be carried out while the electrode is still hot and the coating has a dust-like consistency.

The invention also embraces, in a second aspect thereof, a method of recovery of electrolytic bath residue from an electrode which is to be replaced, such method comprising the steps of removing the electrode from the bath, causing or allowing the electrode to cool so that the bath residue thereon is formed into an encrustation, vibrating the electrode to shake off the encrustation in pieces, and processing the pieces into a form suitable for reuse in the bath.

For preference, the processing step comprises crushing the pieces into chips.

In accordance with a third aspect of the present invention there is provided apparatus for cleaning an electrode removed, together with a support assembly, from an electrolytic bath, the apparatus comprising holding means for holding the electrode support assembly together with the electrode, resilient mounting means resiliently mounting the holding means, and vibrating means operable to vibrate the holding means together with the electrode support assembly and electrode.

In one embodiment, in which the electrode support assembly comprises a support rod and yoke, the holding means comprises a gripping means, for example clamping devices, operable to grip the rod and yoke. For preference, the holding means is so arranged that the rod is disposed in a vertical attitude, for which purpose the gripping means may conveniently include two or more clamping devices arranged in vertical alignment to clamp the rod in position.

The holding means preferably further comprises a support frame carrying such gripping means and the vibrating means may be mounted directly on the frame itself, the vibrating means consisting of, for example, vibratory motors. In one preferred embodiment, two such vibratory motors are provided and are so arranged symmetrically of the vertical centre line of gravity and at an inclination relative to such line as to impart to the support frame an oscillation with both vertical and horizontal components of movement.

The resilient mounting means may consist of, for example, a number of springs or air inflated flexible bags, and for preference the resilient mounting means is itself carried by a frame or other form of support.

An example of the method and embodiment of the apparatus according to the present invention will now be more particularly described with reference to the accompanying drawings in which.

Figure 1:
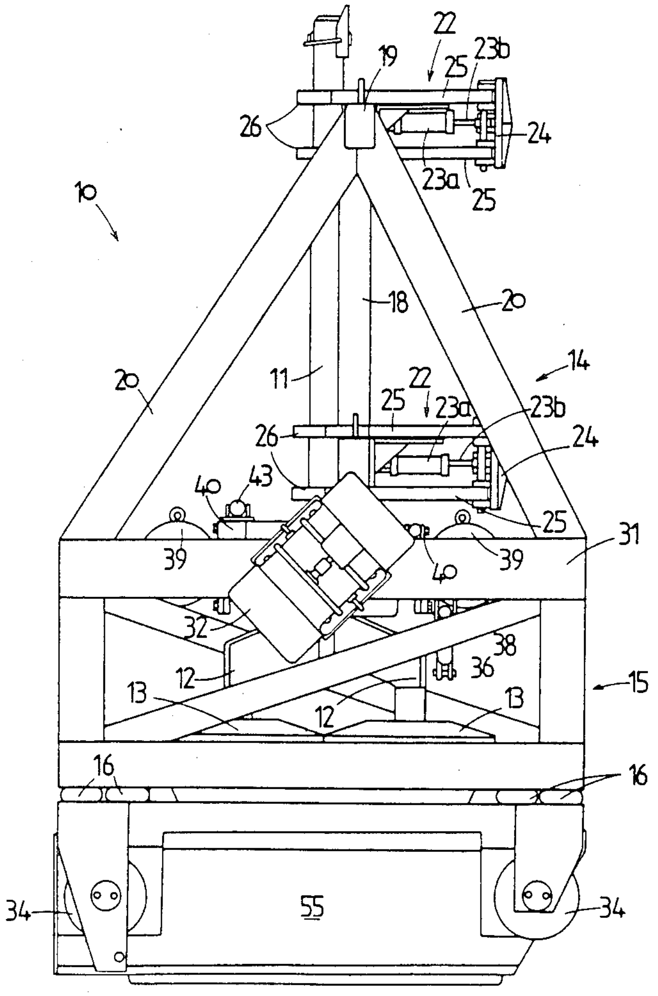
FIG. 1 is a side elevation of the apparatus.

Referring now to the drawing, there is shown a vibratory cleaning apparatus 10 for cleaning, in this particular case, an anode removed, together with its support assembly, from an electrolytic cell or furnace for aluminium production. The apparatus serves to remove from the anode and adjacent parts of the support assembly a coating consisting of residue from the furnace bath, such residue generally consisting of cryolite electrolyte with entrained aluminium oxide.

As shown in the drawing, the anode support assembly consists of an aluminium support rod 11 which is detachably and electrically connectible at its upper end to a busbar and which carries a steel yoke 12 at its lower end. The anode, consisting in this case of two carbon blocks 13, is carried by mounting legs of the yoke 12.

The apparatus 10 comprises a main frame 14 carried on a mounting frame 15 by way of four interposed resilient mounting means which can be formed by springs or, as shown, inflatable flexible air bags 16. The main frame 14 is thus movable within limits relative to the mounting frame 15 as will hereinafter be described. The main frame 14 has a lower portion which incorporates a cross member 17 with a pair of vertically disposed support members 18. The apparatus as depicted in the drawings is designed to carry two anode assemblies, however, it can be equally designed to carry only a single anode assembly. The vertically disposed support members 18 are joined at their upper ends by a cross member 19 which is supported by support members 20 which converge upwardly from the lower portion of the main frame 14. The support members 20 are braced by cross bracing members 21.

Figure 2:
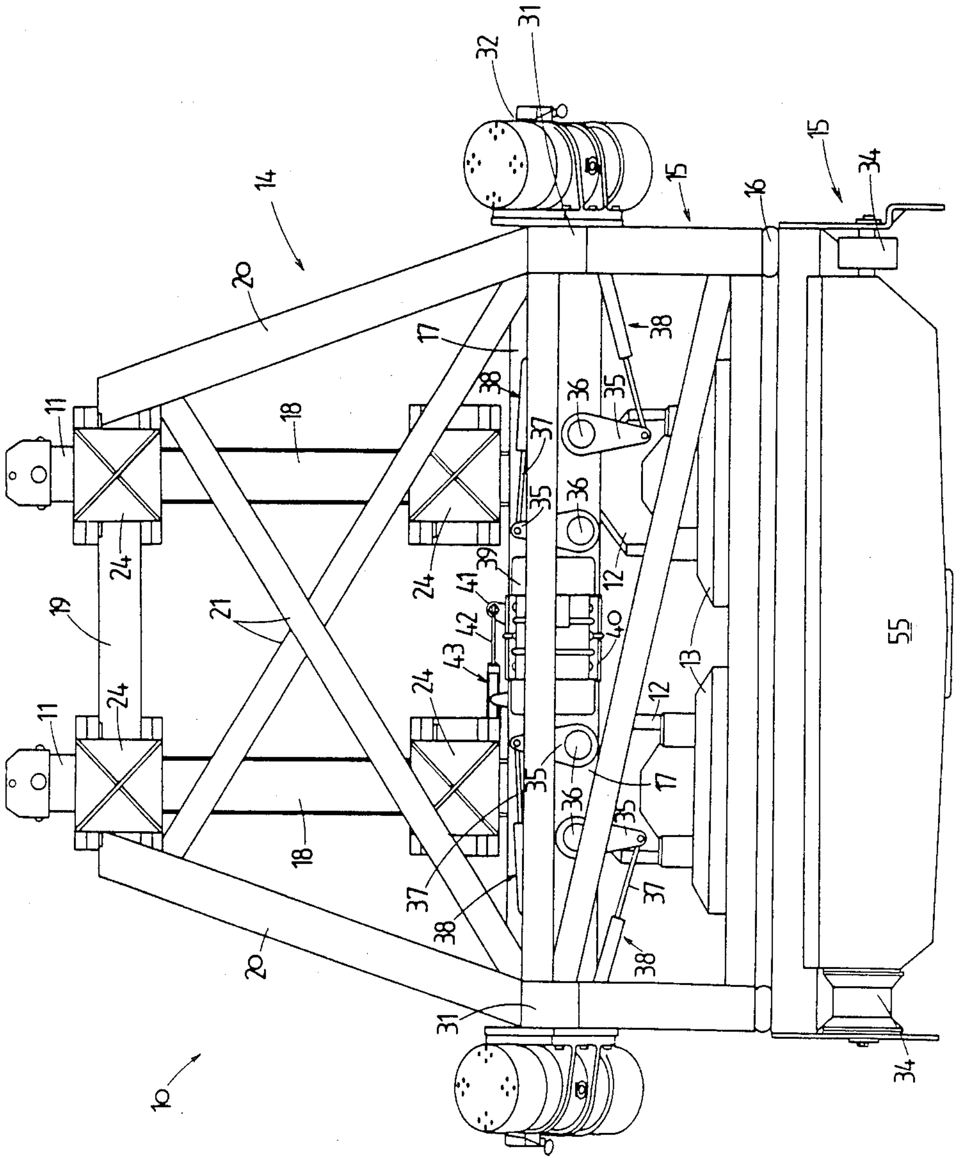
FIG. 2 is a rear elevation of the apparatus shown in FIG. 1.

Each vertical support member 18 is provided with a pair of vertically spaced apart clamping devices 22 which are operable to grip the rod 11 of the anode support assembly, as shown in FIGS. 1 and 2 of the drawings. The clamping device 22 is more particularly illustrated in FIG. 4 of the drawings to which reference is now made. An hydraulic ram 23 has its body **23*a* pivotally coupled to cross member 19 or vertically orientated support member 18. The piston rod 23*b* is pivotally coupled to a movable plate 24 which itself is pivotally coupled to the extreme ends of four elongate clamp arms 25 which are located in pairs. One pair of arms is situated above the other pair of arms and each pair extends from plate 24 in a direction substantially parallel to the longitudinal axis of ram 23. The free ends 26 of arms 25 are provided with hook portions 27 which in use draw the anode support rod against the cross members 17 and 19 and vertical members 18. Each clamp arm 25 has in its length a pair of ramps 28*a* and 28*b* which extend either side of the length of the arm. These ramps 28*a* and 28*b* are parallel in slope and in use engage against cam surfaces 29*a* and 29*b* respectively, said cam surfaces being fixedly attached to the cross member 19. Preferably a bridge member 30 couples the cam surfaces 29*a* and 29*b***.

Figure 4:
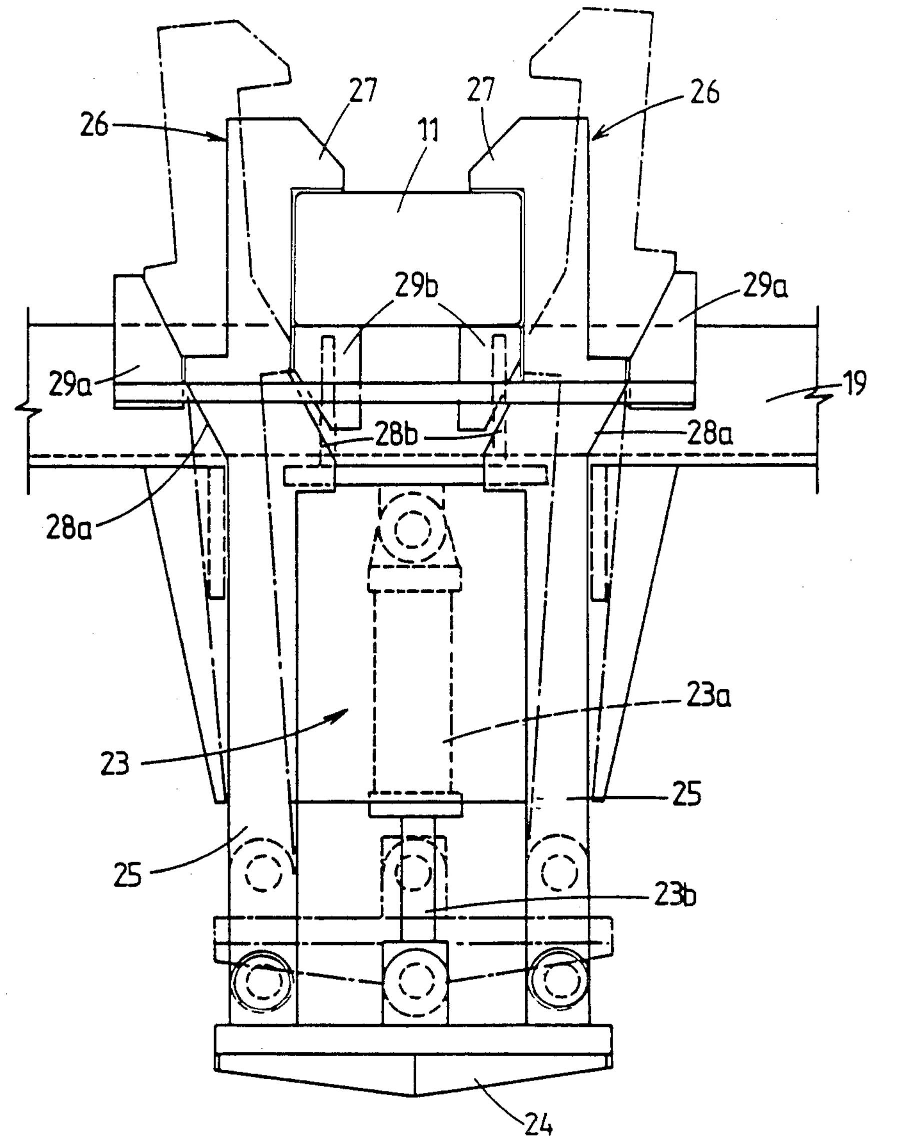
FIG. 4 is a plan view of one of the clamps employed to clamp the support rod of the anode assembly in the apparatus.

In FIG. 4 the clamp device 22 is shown in a position where the support rod 11 is clamped in place in the apparatus. By activating the cylinder 23 so as to draw piston rod **23*b* into body 23*a* the plate 24 is drawn toward vertical member 18 thus causing clamp arms 25 to move which brings ramps 28*a* and 28*b* into engagement with cam surfaces 29*a* and 29*b* so as to cause the free ends 26 to move apart to take up a position as shown in the dotted detail. In such position the support rod 11** is free to be removed from the apparatus.

Mounted on the side members 31 of main frame 14 at either end of the crossbar 17 are two electric vibratory motors 32 operable to vibrate the entire subframe and elements supported thereon, including the anode and its support assembly. The motors are mounted exactly on the vertical and horizontal centre lines of gravity of frame 14 and associated elements, including the anode and support assembly, and are inclined at an angle of 45°. Due to this arrangement, the vibratory motors impart to frame 14 an upward and downward, and also forward and backward, vibrating movement of a relatively high frequency. In construction of the apparatus, the vibratory motors may be located in the desired position by establishing the centre lines of gravity of main frame 14 while removed from the main frame but holding a test anode support assembly and anode.

In FIGS. 1 and 2 the mounting frame 15 is shown as being provided with rollers 34. The purpose of these rollers will hereinafter be described, however, they are not essential as the mounting frame 15 can be fixedly retained on a mounting surface such as a floor.

As the support assembly of the anode support rod 11 is constructed from aluminium and the yoke 12 in constructed from steel it is preferable that the yoke 12 also be clamped to the apparatus. This is conveniently carried out by having clamping members mounted by cross member 17 so as to engage with and clamp the yokes 12. Referring more particularly to FIG. 2 of the drawings two clamps are provided for each yoke. Each clamp consists of an operating arm 35 which is mounted on a shaft 36 extending through cross member 17. The free end of arm 35 is coupled to the piston rod 37 of an hydraulic ram 38. The end of shaft 36 projecting from cross member 17 is provided with a hooked arm **36*a* which when control arm 35 is in the position illustrated it engages with the yoke 12 to clamp the yoke to the cross member 17. To release the yoke 12 the piston rod 37 of each hydraulic cylinder 38** is drawn back into the body of the cylinder so as to pivot the hooked clamping arm away from the yoke.

In use of the apparatus 10, and in carrying out an example of the invention, when anodes of an electrolytic cell or furnace are to be replaced the support rod 11 of each anode support assembly is disconnected from the busbar and the entire assembly including the anode is removed from the furnace and placed in the cleaning apparatus 10. The clamping devices 22 and yoke clamps are then closed by the action of hydraulic rams 23 and 38 to firmly clamp the assembly in the main frame 14.

As removed from the furnace, the carbon blocks 13 of the anode and the yoke 12 of the support assembly have a dustlike coating consisting of cryolite and alumina from the furnace bath, the carbon blocks being red hot at the time of removal from the bath. Cleaning of the carbon blocks and yoke to remove the bath residue can be carried out immediately, but for preference the blocks are allowed to cool, for example by leaving them to stand for about 8–12 hours, until the coating has formed into a relatively brittle encrustation. The purpose of carrying out the cleaning operation is firstly to recover the cryolite electrolyte and secondly to free the spent carbon blocks of material that may be detrimental to subsequent processing to recycle the carbon.

The cleaning is effected by running the vibratory motors 32 so that they vibrate frame 14, anode support assembly and carbon blocks at a high frequency, which has the effect of shaking the encrustation off in pieces of, for example, approximately three to four square inches.

When the encrustation has been completely removed, which may, for example, take approximately one minute, the removed pieces are crushed in crushing plant to form chips which are ultimately reused in the electrolytic bath. The spent carbon blocks 13 are driven off the yoke 12 and replaced with new blocks.

The old blocks are crushed and the resulting carbon powder is eventually remoulded with fresh powder and baked in a kiln to form new anode blocks. Due to the prior cleaning of the used blocks, the carbon powder is free of any impurities which might otherwise escape from the new blocks during baking and corrode the brick lining of the kiln.

Normally the two vibratory motors 32 are sufficient to carry out the cleaning operation however in some instances supplementary vibratory movement is required. Accordingly a second pair of vibratory motors 39 can be provided and is mounted on a mounting plate 40 coupled to cross member 17. This mounting plate 40 is mounted for rotational movement about a horizontal axis and has an arm 41 which is pivotally coupled to the piston rod 42 of an hydraulic ram 43. The vibratory motors 39 can thus operate whilst in the disposition shown in FIGS. 1 and 2 of the drawings or can be operated once the mounting plate 40 has been revolved to a position preferably where the motors are inclined at an angle of 45°. These vibratory motors 39 are operated only after the first pair of vibratory motors 32 have been shut down. By way of illustration the side vibratory motors 32 can be operated for approximately one minute with the centre vibratory motor 39 being operated, say at an angle of 45°, for approximately 20 seconds.

As mentioned previously the main frame 14 can be coupled to the mounting frame 15 by spring members though in the illustrated embodiment it is mounted on eight inflatable flexible air bags 16 disposed at each corner of the main frame 14. These air bags 16 are inflated prior to the vibratory motors 32 being operated and then deflated prior to the anode support assembly being removed from frame 14. When the bags 16 are deflated main frame 14 is lowered so that V shaped members 57 engage on supports (not shown) extending from mounting frame 15 so that the weight of main frame 14 is not borne by the air bags 16.

Figure 3:
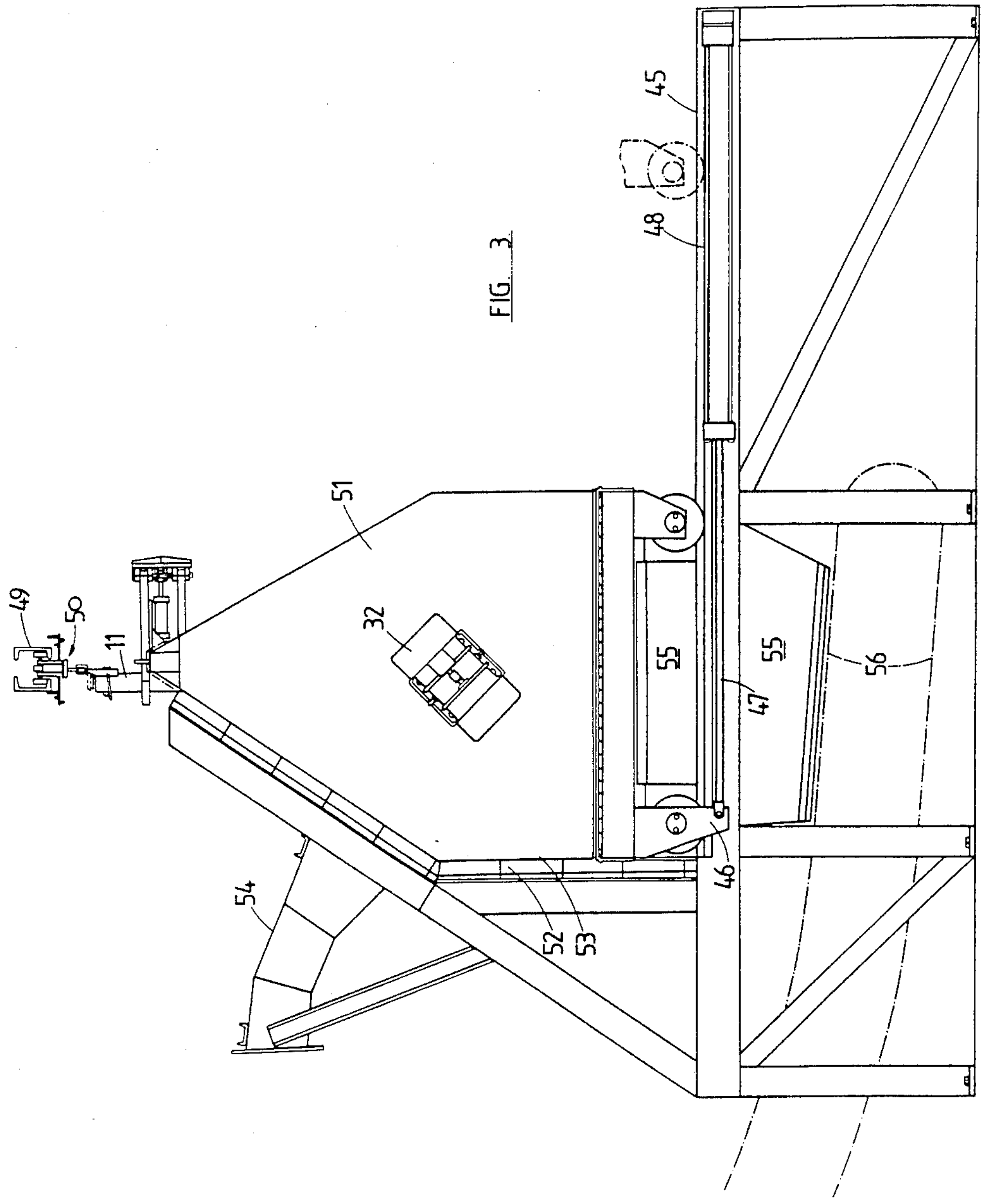
FIG. 3 is a side elevation of the apparatus shown in FIGS. 1 and 2 in combination with a mounting structure.

As stated previously mounting frame 15 can be merely mounted to a fixed support though as depicted in FIGS. 1 and 2 mounting frame 15 is provided with rollers or wheels 34. This enables the apparatus 10 to be used in combination with a mounting structure which is more particularly shown in FIG. 3 of the drawings. Reference will now be made to FIG. 3 in further describing the mounting structure.

The mounting structure comprises a pair of support rails 45 (one only being evident in FIG. 3) on which the wheels or rollers 34 of mounting frame 15 are engaged. A downwardly extending leg portion 46 of support 15 is coupled to the free end of a piston rod 47 of an hydraulic cylinder 48. The apparatus 10 can thus be moved along rails 45 so that once the clamping devices 22 and yoke clamps are released the apparatus 10 can be drawn away from the anode support assembly. As shown in FIG. 3 the upper end of anode support 11 is coupled to an overhead gantry 49 by a trolley 50. When the anode support assembly is clamped in main frame 14 the air bags 16 are inflated so that the anode support rod 11 is raised to the position shown in dotted detail in FIG. 3. The weight of the anode support assembly is thus removed from the overhead gantry 49.

In this form the main frame 14 is enclosed by sheet cladding 51 with only the vibratory motors 32 being located outside the enclosure formed by the cladding. The apparatus 10 when in the position shown in FIG. 3 engages with a cover assembly 52 which engages with and covers the open front end 53 thereof. At least one extractor duct 54 is coupled to the cover assembly 52, this duct being coupled to an extractor fan (not shown). This means that when the cleaning is effected whilst the electrode is still hot dust laden air can be extracted from within the confines of the apparatus 10.

The support frame 15 is provided with a downwardly depending chute 55 which opens above a conveyor 56. Accordingly the encrustation being shaken from the anode can pass through chute 55 and onto conveyor 56 to be taken away for further processing.

In a typical operation the apparatus 10 is located away from extractor cover 52 and one or a pair of anode support assemblies are moved along overhead gantry 49. The hydraulic ram 48 is then operated to push apparatus 10 into engagement with the extractor cover 52 whereupon the support rod 11 of each anode support assembly comes into engagement with the cross members 17 and 19 and vertical member 18 of the main frame 14. The yoke clamp hydraulic cylinders 38 are then activated to clamp the yoke in position following which the hydraulic cylinders 23 of clamping devices 22 are operated to clamp the anode support rod. The air bags 16 are then inflated to lift the main frame 14 upwardly and thus take the weight of the anode support assemblies from the overhead grantry 49. The side vibratory motors 32 are then operated for a period of time following which the central vibratory motors 39 can be operated if required. Once the vibratory motors 32 and 39 (if used) are shut down and vibration has ceased the air bags are deflated and the clamping devices 22 and yoke clamps are released. The apparatus 10 is then removed under the action of hydraulic ram 48 thus allowing the anode support assemblies to be removed.

It will be readily apparant that the example of the method and embodiment of the apparatus as hereinbefore described may be subject to variation or modification without departing from the scope of the invention as defined in the appendant claims.

What is claimed is:

1. A method of cleaning a spent anode assembly after removal from an aluminum reduction cell, said assembly including a support rod and yoke and portions of at least one rigid carbon electrode held on said support rod and yoke and upon which is depositied solidified electrolytic material including fused cryolite, alumina and other materials used in the aluminum reduction process, said method comprising the steps of: (a) coupling a vibratable assembly rigidly to the support rod and yoke; and (b) applying acceleration forces substantially through the centre of gravity of the vibratable assembly and supported spent anode assembly so that each said carbon electrode has applied thereto an acceleration pattern to remove the solidified electrolytic material therefrom by generating tensile and shear forces greater than the adhesive force between the electrode and said electrolytic material.

2. A method as claimed in claim 1, including the step of allowing said assembly to cool at least four hours before being supported in the vibratable assembly.

3. A method as claimed in claim 1, wherein said acceleration forces are of a frequency high enough to impart a linear shaking to each suspended carbon electrode.

4. A method as defined in claim 1, wherein the mass of the vibratable assembly is such that any variation of the mass of the said carbon electrodes forming part of the spent anode assembly will not substantially influence the centre of gravity of the vibratable assembly and the associated spent anode assembly.

5. A method as defined in claim 1, wherein the vibratable force incorporates a vertical and horizontal component which in use assists in moving any extraneous material broken loose from the spent anode assembly free from the top surface of each of said carbon electrodes.

6. A method as defined in claim 1, wherein the anode assembly is supported with the rod held substantially vertically with each of said electrodes dependent therefrom.

7. A method as defined in claim 1, wherein the vibratory force is applied to the vibratable assembly and associated spent anode assembly for approximately one minute.

8. A method as defined in claim 1, including the additional step of using a supplementary vibratory motion of a different pattern to the first vibratory motion.

* * * * *